MAGNETIC LADDIC CORE DEVICE

Filed Sept. 23, 1965 6 Sheets-Sheet 1

| Laddie | h | w | x | y | z | lm | li | lp = | lu(B) | $l_p l_u^2$ | $l_m l_u$ |
|---|---|---|---|---|---|---|---|---|---|---|---|
| I mm | 0·64 | 0·31 | 0·51 | 1·57 | 1·78 | 3·46 | 1·60 | 2·54 | 7·38 | 0·34 | 0·48 |
| $10^{-3}$ in | 25 | 12 | 20 | 62 | 70 | 138 | 628 | 100 | 291 | | |
| II mm | 1·47 | 0·38 | 0·46 | 3·15 | 3·15 | 3·84 | 1·44 | 2·64 | 13·0 | 0·20 | 0·30 |
| $10^{-3}$ in | 58 | 15 | 18 | 124 | 124 | 151 | 56·5 | 104 | 512 | | |
| III mm | 1·27 | 0·51 | 0·58 | 1·52 | 1·52 | 5·03 | 1·88 | 3·43 | 7·34 | 0·47 | 0·685 |
| $10^{-3}$ in | 50 | 20 | 23 | 60 | 60 | 198 | 72·2 | 135 | 289 | | |

INVENTOR.
MICHAEL J. UNDERHILL
BY
Frank R. Trifari
AGENT

Sept. 29, 1970 M. J. UNDERHILL 3,531,784

MAGNETIC LADDIC CORE DEVICE

Filed Sept. 23, 1965 6 Sheets-Sheet 2

INVENTOR.
MICHAEL J. UNDERHILL
BY
Frank P. [signature]
AGENT

INVENTOR.
MICHAEL J. UNDERHILL
BY
Frank R. Trifari
AGENT

Sept. 29, 1970 M. J. UNDERHILL 3,531,784

MAGNETIC LADDIC CORE DEVICE

Filed Sept. 23, 1965 6 Sheets-Sheet 4

INVENTOR.

MICHAEL J. UNDERHILL

BY

AGENT

INVENTOR.
MICHAEL J. UNDERHILL
BY
Frank P. [signature]
AGENT

Sept. 29, 1970 M. J. UNDERHILL 3,531,784

MAGNETIC LADDIC CORE DEVICE

Filed Sept. 23, 1965 6 Sheets-Sheet 6

INVENTOR.
MICHAEL J. UNDERHILL
BY
Frank R. Trifari
AGENT

United States Patent Office 3,531,784

Patented Sept. 29, 1970

3,531,784

MAGNETIC LADDIC CORE DEVICE

Michael James Underhill, Ifield, Crawley, England, assignor, by mesne assignments, to U.S. Philips Corporation, New York, N.Y., a corporation of Delaware Filed Sept. 23, 1965, Ser. No. 489,525
Claims priority, application Great Britain, Oct. 14, 1964, 41,890/64, 41,891/64, 41,892/64, 41,893/64
Int. Cl. G11c *11/06, 19/00*
U.S. Cl. 340—174 8 Claims

ABSTRACT OF THE DISCLOSURE

A laddic core element comprised of ferromagnetic material and having a plurality of main apertures defined by rails and rungs with an auxiliary aperture on each side of each main aperture. The laddic element can be wired for carry generation by threading coils through a rail aperture, a rung aperture and a main aperture, and sensing an output on a non-threaded aperture. The laddic can be used as a bistable switching device, or as a pulse converter.

This invention relates generally to multiaperture magnetic cores and particularly to the construction and application of multiapertured magnetic core devices.

The magnetic cores referred to throughout this specification are of the general ladder configuration first described by U. F. Gianola and T. H. Crowley in the Bell System Technical Journal, January 1959, pages 45 to 72, for use in magnetic logic systems and given the name laddic, derived from the combination of words ladder logic. There laddic cores are constructed from a ferrite material having a substantially rectangular hysteresis loop and having windings arranged on the various limbs of the core for setting a preferred direction of magnetization in parts of the core, depending on the particular function of the winding.

Magnetic logic systems, i.e. logic systems using only magnetic elements, are preferable for many applications such as in control systems for nuclear reactors, railway signalling and certain forms of computer circuitry where "fail safe" characteristics of the system are essential, as where the presence of a fault in the system itself through a cause such as the failure of a component will not cause the output of the system to give a spurious result which could result in an accident or for industrial control systems in general.

Laddic cores have been used in many systems having this fail safe requirement and since a fairly fast logic rate on the order of $10^4$ pulses per second is realizable the extension of their use to other applications where a "fail safe" characteristic is not a paramount requisite has been made. Most of the systems using laddic cores previously described have used unipolar pulses and it is obvious that an increase in logic speed could be achieved if bipolar pulses are used. Also, the use of an improved laddic device for logic and arithmetic functions is desirable.

Various logic circuits employed within computer systems such as arithmetic and gating operational units can be developed utilizing the improved laddic core of the present invention.

It is a further object of the invention to provide a modified form of laddic core which can use unipolar pulses and, additionally, in which advantage can be taken of the properties of bipolar pulses.

It is a futrher object of the invention to provide a laddic device which is capable of generating a carry bit at any stage of the device for use in a binary adder.

It is another object of this invention to provide a multiapertured magnetic device which is capable of performing OR and AND logic functions using bipolar impulses.

It is a still further object of this invention to provide a multiaperture magnetic device capable of converting D.C. pulses to amplified bipolar pulses.

These and other objects of the invention will appear as the specification progresses and will be pointed out in the claims and illustrated in the accompanying drawings, which disclose, by way of example, the principle of the invention and the best mode contemplated of applying that principle.

The invention will now be described in greater detail with reference to the accompanying drawing wherein:

FIG. 1 shows a laddic core device constructed in accordance with the invention.

FIG. 2 presents a tabular form of dimensional possibilities for the laddic device of FIG. 1.

FIGS. 3(*a*) and 3(*b*) illustrate sectional views of a laddic device capable of generating a carry bit for a binary adder.

FIGS. 4(*a*) to 4(*h*) illustrate the flux patterns in the sections of FIGS. 3(*a*)–(*b*).

FIG. 5 shows a multiaperture device capable of performing OR and AND logic functions using bipolar pulses.

FIGS. 6(*a*) to 6(*b*) show the flux state of the core of FIG. 5.

FIGS. 7(*a*) and 7(*b*) show various practical embodiments of the application of FIG. 5.

Figures 1, 2:
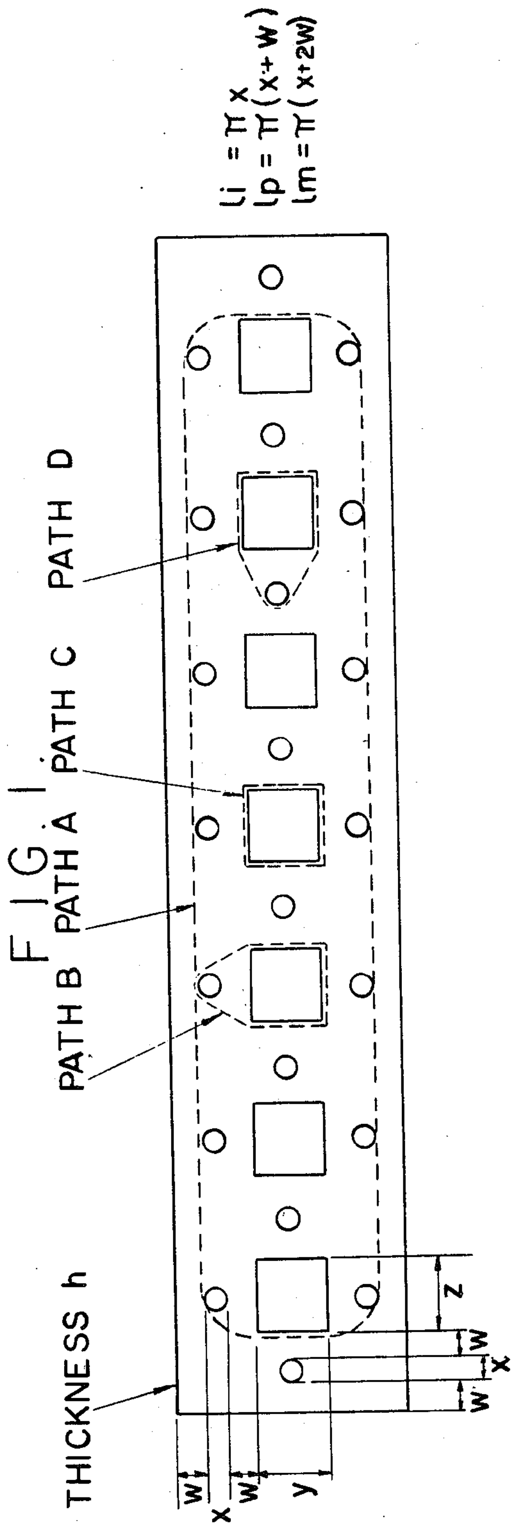

According to one aspect of the present invention a laddic core is provided with an auxiliary aperture in one or more of the side rails of the core, said auxiliary aperture being of a small diameter relative to the main apertures of the core formed by the side rails and rungs.

There preferably one such auxiliary aperture in each side rail on either side of each main aperture and extending along an axis parallel to the axes of the main apertures. The auxiliary apertures may be situated in a position such that there is an equal amount of magnetic material between one side of the aperture and the inside edge of the side rail as there is between the opposite side of the aperture and the outside edge of the side rail. The aperture is preferably of a cross section smaller than either of said amounts of material.

The auxiliary aperture is preferably circular in cross section although it may be square or rectangular for certain applications of the core. The core may also incorporate further auxiliary apertures in the rungs of the core.

In accordance with the invention, the core can be used in devices such as a shift-register instead of a plurality of transfluxors coupled together by coupling loops. This gives an advantage over using individual transfluxors in that one rigid construction can be used instead of a flexible arrangement comprising a number of individual wired cores. If the core is to be used as a transfluxor so that flux interference between adjacent areas of the core does not occur, a seven hole laddic core could be used as four separate transfluxors. However, under certain conditions such as when one outer leg of each hole is driven in a common direction, all the holes may be used to form a seven core transfluxor. This may cause noise but it may not always be troublesome.

Depending on the use to which a core is to be put, the dimensions thereof can be important. For good laddic operation the square rather than rectangular shape for the major aperture is a good compromise. If the cross rungs are too short signal flux is lost by the imperfect squareness of the material in that the flux in a pair of half limbs is allowed to become unequal. This is more noticeable for figure of eight hold windings, because for half rung holds a surplus of flux tends to be driven out of the hold rung and not fully returned through the adjacent passive half rung. This flux acts in the signal aiding direction and will ameliorate the signal loss, provided that the effect is not great enough in the last few rungs to create a noise signal from there. If the rungs of the core are too long, there is insufficient difference between the path lengths of adjacent (full) hold rungs for all the flux to take the shorter path, again causing noise. It is these unsquareness effects which limit the number of sections of laddic which can be used before the signal or signal to noise ratios deteriorates too far.

The overall length of the laddic also has to be as short as possible or else the current requirements of the first holds of a many section laddic are too high and, for an all-magnetic system, the resistance of a loop coupling into one of these holds has to be so low that either the wire becomes too thick for the small apertures or the inductance becomes relatively too high.

In an all-magnetic system, for a given length of laddic, the required input coupling loop resistances can be raised by increasing the flux in the receiving leg through increasing the cross-sectional area. This means that the wall width $w$ and the thickness $h$ of the laddic, shown in FIG. 1 of the accompanying drawing, should be large. However, inspection of the figure shows that if $w$ is increased too far, the prime unblocking paths become short relative to the maximum prime paths, assuming all the apertures on one side rail are primed. The unblocking effect on path A is greater than on paths B and D and is greater for a long laddic. Path A couples all the primed output legs on the side rails. The effect can be reduced by including an unused and hence unprimed section after every four or five sections, giving a greater prime range. Prime path C can be avoided by using the outer of the side rail legs for outputs, or by ensuring the apertures, in the rungs adjacent to a rung giving an output, are primed. Simultaneous outputs from cross rungs and side rails should be avoided as this doubles the M.M.F. around the unblocking paths.

The unblocking paths B and D can be increased in length by increasing the auxiliary aperture diameter $x$ at the expense of $w$, in making the small aperture larger. However, this decreases the values of the flux in the transmitting and receiving legs although it is advantageous to have the small apertures large for ease of winding.

For best prime range the main aperture size, $y$, should be large, but taking all the other factors into consideration it is recommended that a relatively stocky shape should be used. This satisfies the requirements of short length, large flux, large small apertures and good mechanical strength. The sacrifice in prime range can be minimized by design of a suitable temperature compensated prime pulse generator, temperature compensation being necessary because the prime current of normal ferrites varies with temperature. In practice the stockily shaped multiaperture devices have been found to be much less critical on drive requirements and coupling loop resistance. In all magnetic systems of the MAD–R type, higher loop resistances are required for higher prime speeds, and the cores with the better path length ratio exhibit a deteriorated prime range, even when the prime pulse is more than long enough.

FIG. 2 shows in tabular form the dimensions of these laddic cores I, II, and III. Laddic core I, although approaching the theoretical ideal, is too fragile and the small aperture too small for ease of wiring. Laddic core II is designed for a better prime range and larger size, but is too long and still rather fragile. Laddic core III is designed in accordance with the aforementioned considerations to be more stocky at the expense of the prime range.

The inclusion of auxiliary apertures in the side rails of the core extends the range of usefulness of laddic cores and various winding possibilities are available, particularly with regard to apparatus using bipolar pulses as will be described in further detail below.

I. CARRY GENERATION

Most computer functions are written in Boolean algebraic terms and when two 1 functions are to be added, for the sake of example, then the sum is a 0 with a carry of 1. It is necessary in the computer to first record the function produced in a register and then to generate the carry to be transferred to the next stage of the summation.

Figure 3A:
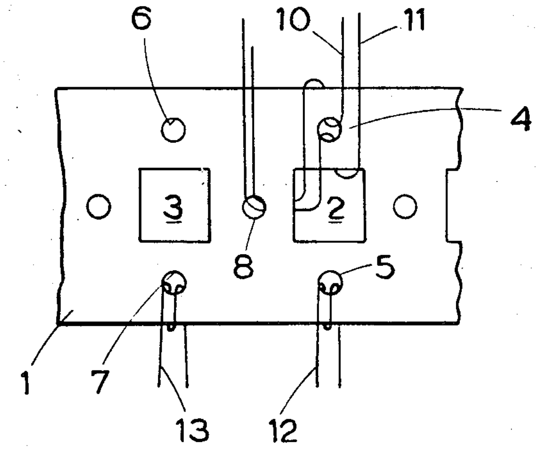
Figure 3B:
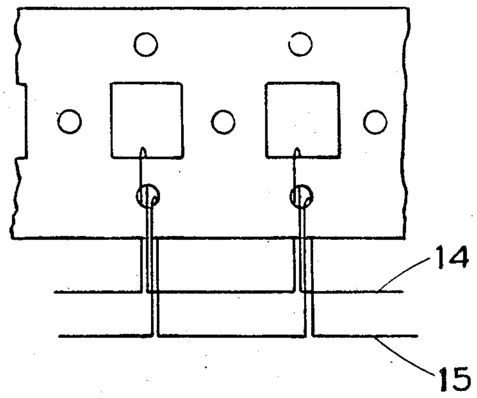
Figure 4:
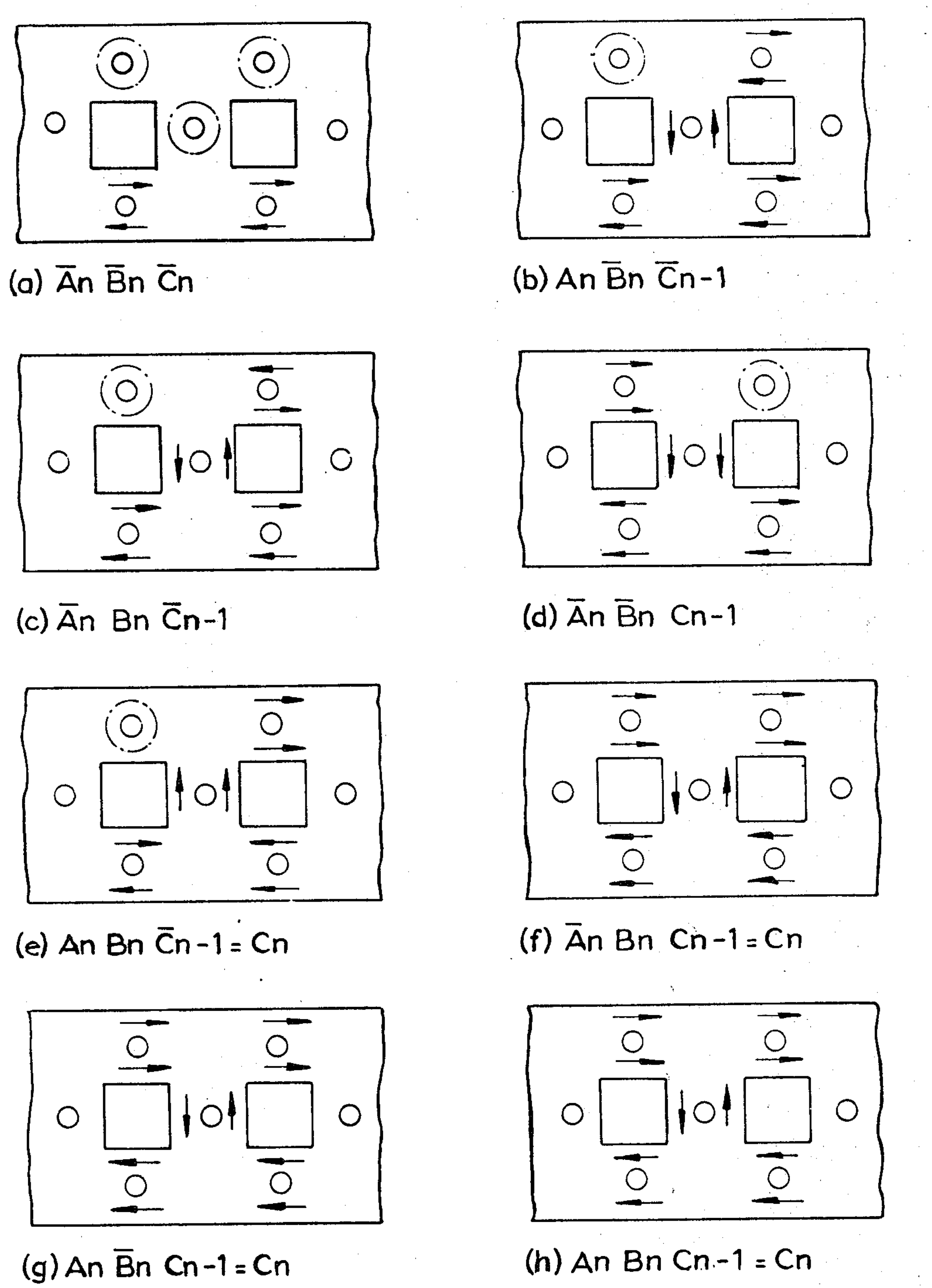

A laddic device which is capable of generating a carry bit at any stage of the device and is suitable for use in a binary adder will now be described by way of example with reference to the accompanying drawings in which FIGS. 3(*a*) and 3(*b*) show a section through a laddic core which has been shown in two parts (*a*) and (*b*) for clarity although in practice all the windings are carried on one core. FIGS. 4(*a*) to (*h*) illustrate the flux patterns in the core part of FIGS. 3(*a*) and 3(*b*) for different conditions.

Referring now to the drawings, the core section 1 is constructed of ferro-magnetic material having a rectangular hysteresis loop and contains two main apertures 2, 3. The side rails flanking the main aperture 2 each has an auxiliary aperture 4, 5 and the main aperture 3, likewise has apertures 6, 7 in its side rails. The rung separating the main apertures 2, 3 is provided with a central aperture 8.

The section 1 is provided with two input windings 10, 11 which are applied with signal A*n* and B*n* respectively in the form of pulses. Winding 10 is wound through aperture 4 on the outer leg of the side rail and through apertures 2 and 8 to encompass the half of the rung separating main apertures 2 and 3. Winding 11 is wound through auxiliary aperture 4 and aperture 2 on the inner leg of the side rail and then through aperture 8 around one half of the rung. An output winding 12 is wound around the outer leg of the other side rail through auxiliary aperture 5 and a further output winding 13 is similarly wound on the further side rail of the preceding stage of the carry core. A carry signal C*n* is produced on winding 12 and a carry signal C*n*–1 on winding 13. The lower side rails in the drawing also carry prime and drive windings 14, 15 respectively as shown in FIG. 3(*b*). The prime winding 14 is wound through apertures 5 and 7 over the inner leg of the side rails in a figure-of-eight manner to increase the prime range, and the drive winding 15 is wound about the outer leg of the side rail.

In FIG. 4 the flux patterns in the core are shown for the positive drive phase only and it will be understood that with bipolar signals the directions of the arrows will be reversed for the negative phase. The core switches alternately between the positive and negative states depending on the combination of inputs. The closed flux states shown around certain of the axuiliary apertures indicate that a remanence state exists and that the region to which these states relate are inactive for the particular combination of inputs. The exact magnetization is in fact determined by the state existing before the drive pulse occurs in those particular parts of the core.

The full carry core may have anything up to approximately 16 sections. The maximum length is governed by the considerations of how large the drive and first hold currents can be in practice, and how far the signal to noise ratio decreases due to leakage flux on a long laddic of some particular material. The worst case corresponds to a carry propagating the entire length of the core, such as in the addition of +1 and −1. Here the two least significant inputs must have sufficient current to switch flux around the entire length of the core. The hold rungs are held by one or other of the $A_n$ or $B_n$ inputs but there is no assisting effect on the side rails, as only one of the pair is present.

The operation of the carry generator will now be explained using the flux patterns of FIG. 4 and referring to the output conditions in Boolean algebraic terms.

FIG. 4(*a*) $\overline{A}_n\overline{B}_n\overline{C}_{n-1}$ (no inputs). Flux state of lower rail established by drive winding. No carry propagated.

FIG. 4(*b*) $A_n\overline{B}_n\overline{C}_{n-1}$. The $A_n$ input establishes flux direction in the upper rail and also holds the cross rung. No carry propagated.

FIG. 4(*c*) $\overline{A}_nB_n\overline{C}_{n-1}$. The upper rail pattern reversed, otherwise the same as for FIG. 4(*b*).

FIG. 4(*d*) $\overline{A}_n\overline{B}_nC_{n-1}$. Carry signal from the left switches down the cross rung, which is not held. No carry propagated.

FIG. 4(*e*) $A_nB_n\overline{C}_{n-1}=C_n$. The $A_n$ and $B_n$ inputs satisfy the "and" condition in the upper rail, to give a carry signal $C_n$, propagated to the right. $A_n$ and $B_n$ in this case initiate the carry signal and must be able to supply enough M.M.F. to drive the flux to the end of the carry core. Output $C_n$ is obtained on the next drive pulse.

FIG. 4(*f*) $\overline{A}_nB_nC_{n-1}=C_n$. The carry signal $C_{n-1}$ from the left is held by the action of $B_n$ on the hold rung and propagated as $C_n$ to the right. Output $C_n$ is obtained on the next drive pulse.

FIG. 4(*g*) $A_n\overline{B}_nC_{n-n1}=C_n$. Here the action is the same as for FIG. 4(*f*) but with $A_n$ holding the cross rung.

FIG. 4(*h*) $A_nB_nC_{n-1}=C_n$. The flux pattern is the same as for FIG. 4(*f*) and FIG. 4(*g*) and the same action takes place. However in this case the satisfaction of the "and" condition in the upper rail provides additional M.M.F. to assist the propagation of the carry to the right.

There are 64 possible transitions between eight different sets of conditions which can pertain for each of two consecutive drive pulses. It is necessary to determine how much flux has to be switched by, or is read-back into, the input windings for each one of these transitions, so that the input requirements can be established. Some of the eight sets of inputs result in the same flux patterns which simplifies matters.

Inspection of all possible transitions shows that the input winding is required to switch up to two half units of flux or sometimes to absorb one half unit of read-back flux. There is no case of two half units being read-back despite each input (except the least significant pair) coupling the core on two legs. Thus in an all-magnetic system an input coupling loop has, for example, more than four turns on the output leg of the previous device, one turn on a subtraction leg, and one turn around each of the two input legs.

The carry generator could be used with unipolar pulses or pulsed D.C. but the operating time would not be so fast.

If undue noise signals appear when the invention is applied to a long shift register having a number of carry stages, suppression may be obtained by winding the input windings around the leg of the rung between the main aperture 3 and the aperture 8.

II. LOGIC DEVICES

Logic devices operate generally on a gating system which produces outputs dependent on certain predetermined input conditions. The most commonly used gates are the AND and the OR gate. The AND gate gives an output when more than one input is present i.e. if there are two signal sources A and B an output will be obtained from a two input AND gate when the input connected to source A and the input connected to source B both receive a signal simultaneously. The OR gate will give a signal if the input connected to source A or the input connected to source B receives an input and it will also give an output if both of these inputs receive signals.

It is sometimes necessary to use a modified form of OR gate which does not give an output if both inputs are present but only if one of the inputs is present and not the other. This type of gate is known as the "exclusive OR" and for the two signals A and B gives an output only for either of two input conditions: signal A is present but B is not, or signal B is present and A is not.

In Boolean algebraic form the AND function is written as AB, the OR function is $A+B$ and the exclusive OR function as $A\overline{B}+\overline{A}B$, the bar over the letter signifying a NOT function.

Figure 5:
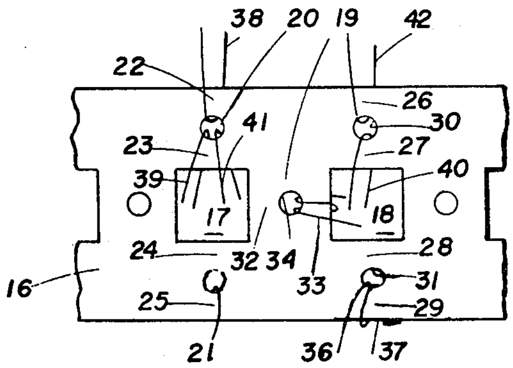

A multiaperture magnetic device which is capable of performing OR and AND logic functions using bipolar pulses is illustrated in FIG. 5 wherein a part of a core 16 is constructed of magnetic material having a substantially rectangular hysteresis loop having two major apertures 17, 18, separated by a rung member 19. The major aperture 17 is bounded by two side rails each having a minor aperture 20, 21, respectively dividing the side rails into equal inner and outer legs 22, 23, 24, and 25 respectively. Similarly the major aperture 18 is bounded by two side rails comprising legs 26, 27, 28, and 29 separated by minor apertures 30, 31 respectively.

The rung 19 is divided into two equal legs 32, 33, by a minor aperture 34. An output winding 36 is wound about the leg 33. A second output winding 37 is wound on leg 29, a drive winding 38 for input signals is wound on leg 22. The device is to be supplied with two input signals A and B; the A signals are supplied to an input winding 39 on leg 23 and an input winding 40 on leg 27, while the B signals are supplied to a separate input winding 41 on leg 23 and an input winding 42 on leg 26. Prime and drive windings associated with the output windings 37, 38, as appropriate are also included in the device but they are omitted from the figure for the sake of clarity.

Figure 6A:
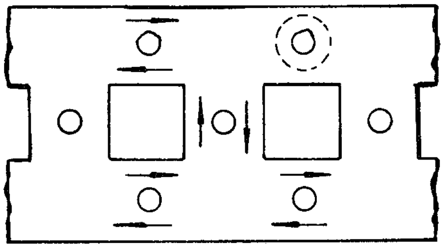
Figure 6:
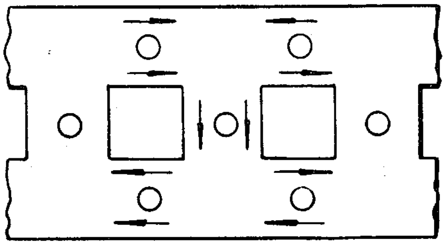
Figure 6C:
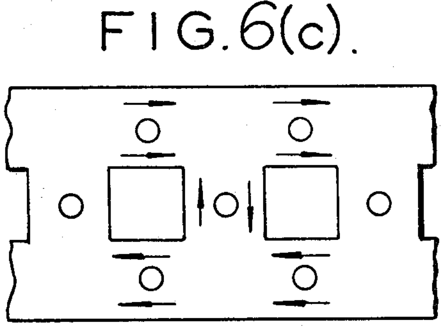

With no A or B input supplied to the windings 39, 40, 41, or 42, the flux in the core is in the remanence state having direction in the various legs as indicated by the arrows in FIG. 6(*a*). An A signal, fed to the input windings 39, 40, will block legs 22 and 23 and cause the flux in legs 22, 23 to switch direction around the shorter path available which is around the major aperture 17 and down the rung member 19. The flux in winding 27 sets up a circulating flux pattern around aperture 30 in the direction shown in FIG. 6(*b*). An output on output winding 36 is obtained by priming and driving the windings (not shown) on the center rung. If an input signal B is applied to windings 41, 42, instead of the signal A to windings 39, 40 a similar blocking of legs 22, 23 occurs and an output signal on windnig 36 is obtained. Thus an OR gate has been formed a representative of the Boolean function $A+B$.

However, the gate is not a pure OR gate due to the windings 40, 42 which, if absent, would allow an output on winding 36 if both A and B signals occurred simultaneously. If the occurrence of the A and B signals coincides, the AND condition in legs 26 and 27 is satisfied and two half units of flux (each half unit being represented by an arrow) now switch along the side rails. The rung member 19 is unblocked by default, no output occurs on winding 36 on the next pulse, and the device operates as an "exclusive OR" gate representative of the Boolean function $A\overline{B}+\overline{A}B$. The flux conditions for this are illustrated in FIG. 6(*c*). The flux directions for this condition can be obtained in winding 37. It will be noted that when the flux switch occurs in legs 26, 27 a similar flux switch occurs in legs 28, 29. This flux change can be detected as an output signal by adding prime and drive windings on legs 28 and 29.

Figure 7A:
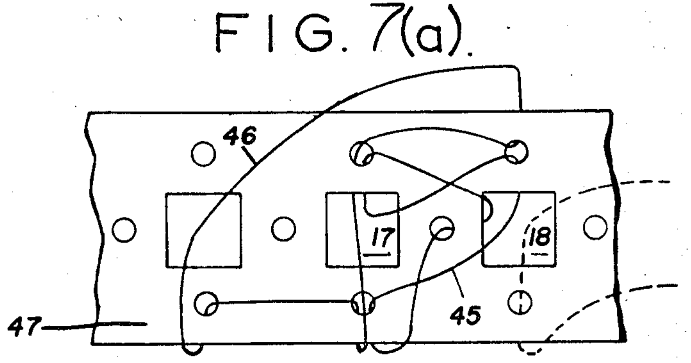
Figure 7B:
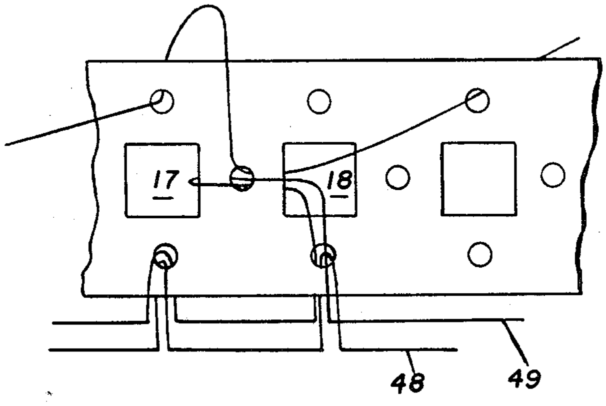

In FIG. 7, to which reference is now made, a part of a core 16 is shown similar to that of FIG. 5. Parts and windings which are common in both figures have been given the same reference numerals. The windings in FIGS. 7(*a*) and 7(*b*) have all been shown separated for clarity but it should be understood that in fact all the windings are on the one core. The winding arrangement shown indicates that the output winding 36 of the "exclusive OR" stage of FIG. 5 is connected as a feedback loop 45 and connected to the A windings 39, 40. This winding 45 also passes through aperture 21 and around leg 25 so that subtraction of interference or noise flux is achieved. The B windings 41, 42 are connected in a feedback loop 46 connected to a previous stage of the device which generates in leg 47 a carry signal for a binary counter. The manner of operation of this carry generator is as set out above. This loop 46 also passes through the subtraction aperture 21.

There are two drive windings, one winding 38 passes through aperture 20 and aperture 34 and the other drive winding 48 passes through apertures 21 and 31. A common prime winding 49 is for all priming purposes.

Figure 8:
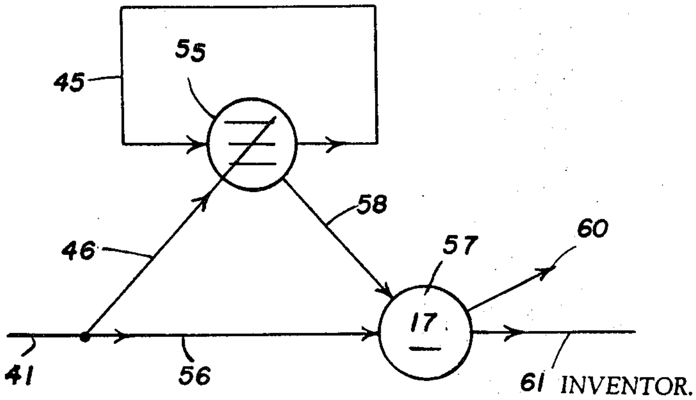
FIG. 8 shows the device of FIG. 7 used in combination with other stages of a binary counter.

The device of FIG. 7 may be used as a triggered bistable divide-by-two device, the output of the exclusive OR stage fed back on winding 45 to the windings 39, 40. This device can be used in a bistable stage suitable for connecting in series with other stages of a binary counter. The logical diagram of such a stage is given in FIG. 8 wherein the gate 55, with its feedback loop 45, represents the gate of FIG. 7 receiving an input over line 46. The signal on line 41 is also fed on line 56 to one input of a two input AND gate 57 the second input of which is fed over line 58 as the output of element 55. Outputs from gate 57 are fed over lines 60, 61 to the next stage.

The first pulse on line 46 enters the "exclusive OR" gate 55 and on the next pulse is fed back over line 45 to the second input, thereby maintaining a "1" indefinitely in the element until the next input pulse is applied. At some number of clock pulses after the first pulse, the second input pulse arrives at gate 55. This time it will be simultaneous with the feedback "1" already in the gate, thereby satisfying the condition that the gate must give no output on its next pulse. Thus the gate is returned to its "0" state. The AND gate 57 has both its inputs present only when an input pulse is supplied over line 56 and due to the "1" stored in gate 55 there is a "1" on line 58. Hence the AND gate 57 has a divide-by-two function and gives a single output pulse for every two pulses received over line 56.

The arrangement described is for use with bipolar pulses. If unipolar pulses are to be used then necessary obvious modifications would have to be made such as adding drive and prime windings.

III. PULSE CONVERSION

Figure 9:
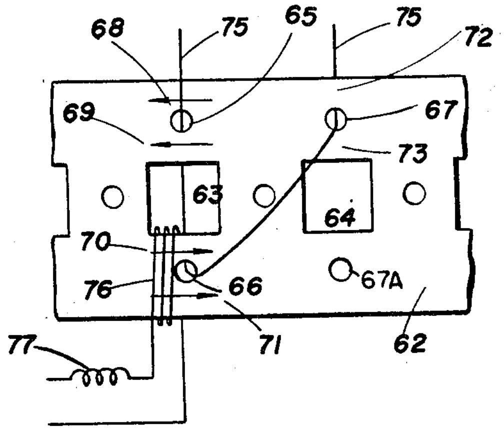
FIG. 9 illustrates the laddic core devices as an amplifier for converting a D.C. input to a bipolar output.
Figure 10:
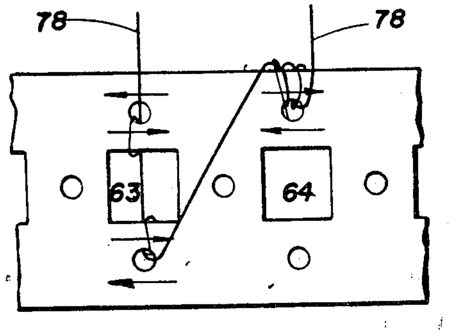
FIG. 10 illustrates the flux disposition in the amplifier of FIG. 9 following a positive drive pulse.

In systems and devices such as counters employing multiaperture magnetic cores made from ferrite having a substantially rectangular hysteresis loop it is often convenient to employ bipolar pulses for feeding information to the various parts of the system rather than D.C. pulses. If the information is only obtainable from its source in the form of D.C. pulses it is necessary to convert it to a bipolar form before it is processed. It is often advantageous to amplify the input signals before processing and a multiaperture magnetic device capable of converting D.C. pulses to amplified bipolar pulses is illustrated in FIG. 9. The amplifier comprises the core 62 having major apertures 63, 64 with central minor apertures 65, 66, 67, 67A respectively in the associated side rails. The aperture 65 splits the side rail around aperture 63 into two equal legs 68, 69; the aperture 66 forms two equal legs 70, 71 and the aperture 67 two equal legs 72, 73. A drive winding 75 passes through aperture 65 and is wound with one turn around leg, 69, through aperture 66 and wound with one turn around leg 70, and on through aperture 67 with one turn around 72, thereby forming the subtraction or cancellation leg of the amplifier. An input winding 76 is wound with four turns on the side rail comprising the two legs 70, 71, and this winding has a choke 77 connected in series with it. An output winding 78, shown separately in FIG. 10 for the sake of clarity, is wound in a manner similar to the drive winding 75 except that it has two turns each about legs 69 and 70 and four turns about leg 72, so that in the absence of any input, as the core switches back and forth between positive and negative drive conditions, complete cancellation occurs and no output is produced. The output winding is preferably arranged to have as many turns through the subtraction aperture 67 as it has in total through the entire core in order to achieve signal cancellation.

Figure 11:
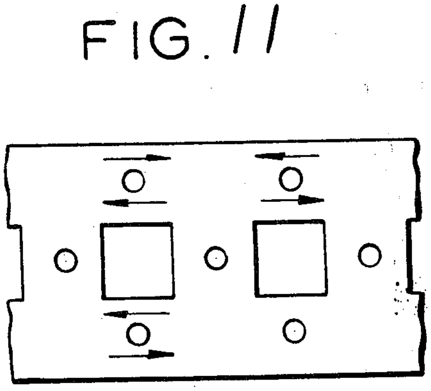
FIG. 11 illustrates the flux disposition in the amplifier of FIG. 9 following a negative drive pulse.

In order that the operation of the amplifier may be readily understood, the cores in the figures have been marked with arrows each showing the direction of a half unit of flux in the core for a particular condition. FIG. 9 shows the condition when an input has been received, FIG. 10, the condition after the following positive drive pulse and FIG. 11, the condition after the following negative drive pulse. The input is presented in the form of D.C. pulses. When the input is present in between drive pulses the core is slowly returned to the condition shown in FIG. 9 under the action of the input current. For each positive drive pulse the core switches from the condition shown in FIG. 9 to that of FIG. 10 and still the leg 70 does not switch, cancellation does not occur in the output winding, and a positive output pulse is produced. Similarly, as shown in FIG. 11, no switching of the leg 69 occurs after a negative drive pulse and thus a negative output pulse is obtained. The combined effect is to produce a series of bipolar output pulses.

The input winding 76 has as many turns as are required for the desired sensitivity, but the input M.M.F. must not be too large since the drive M.M.F. must be larger. The series inductance 77 prevents too much back read into the input source during the drive pulses. The value of the inductance must not be too high or else the input cannot change from a "0" to a "1" between drive pulses.

The aperture 67 could serve several coupling loops if enough drive M.M.F. were available. This aperture could be replaced by a small subtraction core thus releasing the main aperture 64 of the laddic core for use as another input stage.

While I have described my invention in connection with specific embodiments and applications thereof, other modifications will be apparent to those skilled in the art without departing from the spirit and scope of the invention as defined in the appended claims.

What is claimed is:

1. A ferromagnetic storage element having a plurality of main apertures defined by a first and a second pair of elements, each pair of elements defining a paralled flux path, and an auxiliary aperture within each element of each of said parallel flux paths on either side of each of said main apertures, said auxiliary aperture positioned in said flux path so as to provide an approximately equal amount of magnetic material between said auxiliary aperture and said main aperture as there is between said auxiliary aperture and the edge of said flux path remote from said main aperture, said auxiliary aperture having a cross sectional area relatively smaller than either of said amounts of magnetic material.

2. A ferromagnetic storage element having a substantially rectangular shape with an upper side, a lower side, and a pair of ends, comprising a plurality of four sided main apertures of substantially equal size and spaced substantially equally apart along the length of said rectangular shape between said pair of ends, each of said main apertures having substantially the same amount of magnetic material therebetween, and between the upper sides of said apertures and the upper side of said element, and between the lower side of said aperture and the lower side of said element, and a plurality of auxiliary apertures, each positioned along each side of each main aperture, with adjacent main apertures sharing one auxiliary aperture therebetween.

3. The combination of claim 2 wherein each of said auxiliary apertures is positioned midway in each respective area of magnetic material wherein it lies.

4. A ferromagnetic laddic element comprising a rectangular bar of ferromagnetic material made up of a pair of side rails and a plurality of spaced rungs, each pair of adjacent rungs, together with said side rails, forming a four sided central aperture, and an auxiliary aperture located substantially centrally in each of said rungs and in each portion of said rail adjacent a central aperture.

5. A core storage device for generating a carry bit comprising a ferromagnetic storage element having a plurality of main apertures defined by a plurality of parallel flux paths, each of said flux paths further defining an auxiliary aperture, said flux paths being in the form of horizontal rails and vertical rungs, a plurality of input windings threading an auxiliary aperture in said rail, an auxiliary aperture in said rung, and a main aperture adjacent to both said auxiliary apertures, said input windings establishing a flux through the non threaded rail indicative of a carry signal, and output windings on said non threaded rail for sensing said flux.

6. A logic device comprising a ferromagnetic storage element having a plurality of main apertures defined by a pair of side rails and a plurality of othogonally placed equally spaced rung members, a first auxiliary aperture defined by that portion of one of said rail members contiguous with a first of said main apertures, a second auxiliary aperture defined by that portion of said rail member contiguous with a second of said main apertures, input windings connected to said first auxiliary aperture, further input windings connected to said second auxiliary aperture, said storage element having a stable state of flux remanence but undergoing a change of remanence in response to a predetermined combination of input levels on said input windings, and an output winding threaded through said storage device for sensing said flux change.

7. A device for converting a D.C. pulse input to a bipolar output comprising a ferromagnetic storage element having a plurality of main apertures defined by a pair of side rail members and a plurality of orthogonally placed equally spaced rung members, each of said rail members further defining a plurality of auxiliary apertures, each contiguous with each of said main apertures, a drive winding and an output winding both threaded through first, second and third auxiliary apertures, said first and second auxiliary apertures contiguous with a first one of said main apertures, and said third auxiliary aperture contiguous with a second one of said main apertures adjacent said first aperture, and an input winding threaded through said first main aperture for supplying D.C. pulses to said storage element, said output winding threaded through said storage element so as to sense a change in remanent flux for each D.C. pulse so supplied.

8. A device for converting a D.C. pulse input to a bipolar output comprising a ferromagnetic storage element having a plurality of main apertures defined by a pair of side rail members and a plurality of orthogonally placed equally spaced rung members, each of said rail members further defining a plurality of auxiliary apertures, each contiguous with each of said main apertures, a drive winding and an output winding both threaded through first, second and third auxiliary apertures; said first and second auxiliary apertures contiguous with a first one of said main apertures, and said third auxiliary aperture contiguous with a second one of said main apertures adjacent said first aperture, the winding through said third auxiliary aperture comprising a subtraction winding, said output winding having as many turns through said third auxiliary aperture as through the remaining storage element, and an input winding threaded through said first main aperture for supplying D.C. pulses to said storage element, said output winding threaded through said storage element so as to sense a change in remanent flux for each D.C. pulse so supplied.

References Cited

UNITED STATES PATENTS

| | | | |
|---|---|---|---|
| 3,050,715 | 8/1962 | Stabler | 340—174 |
| 3,138,788 | 6/1964 | Nitzan et al. | 340—174 |

JAMES W. MOFFITT, Primary Examiner

G. M. HOFFMAN, Assistant Examiner